US008572086B2

(12) United States Patent
Soderberg et al.

(10) Patent No.: US 8,572,086 B2
(45) Date of Patent: Oct. 29, 2013

(54) GENERATION OF ANNOTATION TAGS BASED ON MULTIMODAL METADATA AND STRUCTURED SEMANTIC DESCRIPTORS

(75) Inventors: Joakim Soderberg, Solna (SE); Jonas Bjork, Stockholm (SE); Andreas Fasbender, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 355 days.

(21) Appl. No.: 13/145,417

(22) PCT Filed: Jan. 21, 2009

(86) PCT No.: PCT/SE2009/050060
§ 371 (c)(1),
(2), (4) Date: Jul. 20, 2011

(87) PCT Pub. No.: WO2010/085186
PCT Pub. Date: Jul. 29, 2010

(65) Prior Publication Data
US 2012/0023103 A1   Jan. 26, 2012

(51) Int. Cl.
*G06F 17/30* (2006.01)
(52) U.S. Cl.
USPC ............... 707/737; 707/739; 707/780; 706/2; 382/180
(58) Field of Classification Search
USPC ............... 707/737, 769, 780; 706/2; 382/180
See application file for complete search history.

(56) References Cited

U.S. PATENT DOCUMENTS

| 5,633,678 | A | 5/1997 | Parulski et al. |
| 7,023,979 | B1 * | 4/2006 | Wu et al. ................. 379/265.11 |
| 2003/0113109 | A1 | 6/2003 | Pelletier |
| 2004/0049734 | A1 | 3/2004 | Simske |
| 2004/0225686 | A1 | 11/2004 | Li et al. |
| 2005/0053276 | A1 * | 3/2005 | Curti et al. ..................... 382/154 |
| 2005/0169558 | A1 | 8/2005 | Dance et al. |
| 2005/0177574 | A1 * | 8/2005 | Riley et al. ...................... 707/10 |
| 2007/0150802 | A1 | 6/2007 | Wan et al. |
| 2007/0288478 | A1 * | 12/2007 | DiMaria et al. .................. 707/10 |
| 2009/0187567 | A1 * | 7/2009 | Rolle ................................ 707/6 |
| 2010/0005546 | A1 * | 1/2010 | Puthigae et al. .............. 800/289 |
| 2010/0057800 | A1 * | 3/2010 | Hawking ....................... 707/728 |
| 2010/0287159 | A1 * | 11/2010 | Abajian et al. ................. 707/723 |

OTHER PUBLICATIONS

Wong, R.C.F., et al. "Automatic Semantic Annotation of Real-World Web Images." IEEE Transactions on Pattern Analysis and Machine Intelligence, vol. 30, No. 11, Nov. 2008.

* cited by examiner

*Primary Examiner* — Leslie Wong
*Assistant Examiner* — Fariborz Khoshnoodi
(74) *Attorney, Agent, or Firm* — Coats & Bennett, P.L.L.C.

(57) ABSTRACT

In one embodiment, a method of generating annotation tags (28) for a digital image (22) includes maintaining a library (16) of human-meaningful words or phrases organized as category entries (72) according to a number of defined image description categories (70), and receiving context metadata (20) associated with the capture of a given digital image (22). The method further includes selecting particular category entries (72-1, 72-2) as vocabulary metadata (24) for the digital image (22) by mapping the context metadata (20) into the library (16), and generating annotation tags (28) for the digital image (22) by logically combining the vocabulary metadata (24) according to a defined set of deductive logic rules (30) that are predicated on the defined image description categories (70). In another embodiment, a processing apparatus (12), such as a digital processor (18, 26) and supporting memory (14), etc., is configured to carry out the above method, or to carry out variations of the above method.

16 Claims, 6 Drawing Sheets

IF (position == "summer house") AND (image_classification == "indoor") ADD "in summer house" TO set_of_proposed_annotations IF (position == "New York") AND (image_classification == "city scape") ADD "New York City" TO set_of_proposed_annotations IF (position == "summer house") AND (image_classification == "face_detect") ADD "in summer house with friends" TO set_of_proposed_annotations IF (time_of_capture == "Crawfish season") AND (image_classification == "beach") ADD "crawfish hunting" TO set_of_proposed_annotations IF (time_of_capture == "2008-08-20") AND (position == "summer house") AND (image_classification == "group_detect") ADD "mid summer party in summer house" TO set_of_proposed_annotations

*FIG. 7*

IF (position == "summer house") AND (annotation_previous == "vacation Archipelago 2008") AND (equal_day_of_capture) ADD "vacation Archipelago 2008" TO set_of_proposed_annotations IF (video_classification == "soccer match" AND (position == "London" AND (soccer_history == "Arsenal") ADD "Arsenal London" TO set_of_proposed_annotations

*FIG. 8*

GENERATION OF ANNOTATION TAGS BASED ON MULTIMODAL METADATA AND STRUCTURED SEMANTIC DESCRIPTORS

TECHNICAL FIELD

The present invention relates to digital images and their capture, and particularly relates to the generation of annotation tags for digital images.

BACKGROUND

The growth of digital photography and video over the last decade or so has created many new and interesting challenges relating to how people organize, store, and retrieve their multimedia repositories. Unlike for textual data, automatic methods for describing, indexing and retrieving visual media, such as image and video content, are limited to date. Existing multimedia search engines typically rely on manually generated text-based annotations, supported at most by EXIF data, such as the time the capture was taken, the camera model used, etc.

Photo blogging sites such as Flickr further explore location tagging through supportive map tools, but once again the user-generated content needs to be positioned manually on a global map by the authors, which, in practice, is a tedious task for users. Some professional cameras integrate GPS receivers to provide automated geo-tagging of captured images. Similarly, a network-connected capturing device might connect to external information sources, such as a GPS phone, for geo-tagging assistance.

Still further, existing approaches to suggesting annotation tags for given digital image data include approaches based on group or collaborative data, such as common spatial, temporal and social contexts. Group information can be used to infer descriptors for given media content. Other approaches include content tagging based on speech recognition, wherein input speech is recognized and decoded according to a selected speech recognition lexicon. In some sense, such tagging depends on the close temporal relationship between receipt of the user speech and capture of the media.

More broadly, existing approaches to media tagging commonly rely on low-level image or audio features as input to annotate or predict a tag for a photograph. Further, known approaches commonly rely on network-provided metadata from user communities (e.g., aggregated databases of tagging information), which is undesirable in terms of user privacy and in terms of potential data access/transfer latency.

SUMMARY

In one embodiment, a method of generating annotation tags for a digital image includes maintaining a library of human-meaningful words or phrases organized as category entries according to a number of defined image description categories. The method further includes receiving context metadata associated with the capture of a given digital image, and selecting particular category entries as vocabulary metadata for the digital image by mapping the context metadata into the library. Still further, the method includes generating annotation tags for the digital image by logically combining the vocabulary metadata according to a defined set of deductive logic rules that are predicated on the defined image description categories.

In another embodiment, a processing apparatus for generating annotation tags for a digital image includes a memory for maintaining a library of human-meaningful words or phrases organized as category entries according to a number of defined image description categories, and an abstraction processor configured to receive context metadata for the digital image that is associated with its capture and select particular category entries as vocabulary metadata for the digital image by mapping the context metadata into the library. The processing apparatus further includes a rules processor configured to generate annotation tags for the digital image by logically combining the vocabulary metadata according to a defined set of deductive logic rules that are predicated on the defined image description categories.

Of course, the present invention is not limited to the above brief summary of features and advantages. Indeed, those skilled in the art will recognize additional features and advantages of the present invention upon reading the following detailed description and upon viewing the accompanying drawings.

BRIEF DESCRIPTION OF THE DRAWINGS

FIGS. 7 and 8 are diagrams of example embodiments of deductive logic rules used in annotation tag generation.

DETAILED DESCRIPTION

Figure 1:
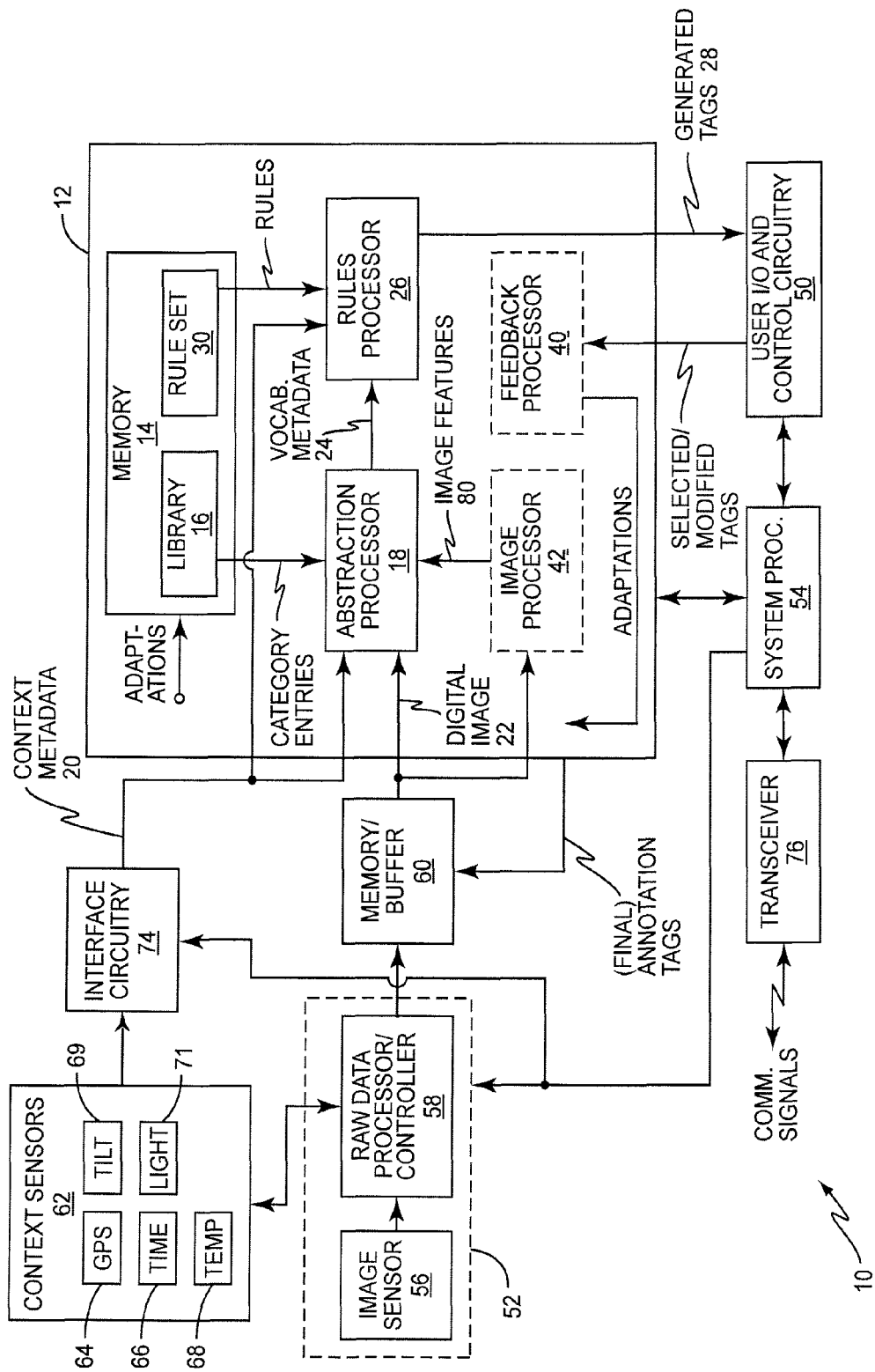
FIG. 1 is a block diagram of one embodiment of an image capture device and an included processing apparatus, for automatic generation of annotation tags for captured digital images.

FIG. 1 illustrates an electronics device 10. In an advantageous but non-limiting embodiment, the device 10 comprises a camera phone or other mobile terminal with image capture capabilities. While the particular architecture and functional elements of the device 10 will vary as a function of intended purpose, as contemplated herein the device 10 includes a processing apparatus 12, for generating annotation tags for a digital image. As used herein, "digital image" encompasses individual still images and related series of images, such as in MPEG movie files.

The processing apparatus 12 comprises an electronic circuit implanted, e.g., as a microprocessor, digital signal processor, Application Specific Integrated Circuit (ASIC), Field Programmable Gate Array (FPGA), Programmable Logic Device (PLD), etc. The processing apparatus 12 includes or is associated with a memory 14, for maintaining a library 16 of human-meaningful words or phrases organized as category entries according to a number of defined image description categories. The processing apparatus 12 further includes an abstraction processor 18 that is configured to receive context metadata 20 for a given digital image 22. The context metadata 20 is associated with capture of the digital image 22, and the abstraction processor 18 uses it to select particular category entries (from the library 16) as vocabulary metadata 24 for the digital image 22.

Generation of the vocabulary metadata 24 by the abstraction processor 18 results from the abstraction processor 18 "mapping" the context metadata 20 into the library 16. Detailed examples of this mapping process appear later herein, but mapping can be understood broadly as determining which image description categories are implicated by the context metadata, and, more particularly, determining which category entries within the implicated categories correlate with the context metadata. As a non-limiting example, ambient temperature may be a component of the context metadata, and "Season" may be an image description category having as category entries "Summer," "Fall," "Winter," and "Spring." A temperature value of −10° C. strongly correlates with the Season category entry "Winter," for example, while a temperature value of +35° C. strongly correlates with the Season category entry "Summer."

In any case, the processing apparatus 12 further includes a rules processor 26 that is configured to generate annotation tags 28 for the digital image 22 by logically combining the vocabulary metadata 24 according to a defined set of deductive logic rules 30. The rules 30 are predicated on the defined image description categories. For example, each rule includes a conditional expression predicated on one or more image description categories, and corresponding category entries from the vocabulary metadata 24 are substituted into these conditional expressions for logical evaluation.

With this basic understanding in place, it will be appreciated that the device 10 may be used to capture a digital image 22, and that the processing apparatus 12 advantageously generates one or more annotation tags 28 for that captured image, wherein the generated annotation tags 28 may be relatively complex, human-meaningful words or phrases that are abstractions logically deduced from the context metadata 20 associated with image capture, according to the vocabulary metadata 24 abstracted from the context metadata 20, and as processed by the rules 30. Such operation is further enhanced in one or more embodiments of the processing apparatus 12 (and the corresponding processing method) by the inclusion of a feedback processor 40, which receives feedback related to a user's selection of or modification of the generated annotation tags 28, and an image processor 42, which derives image characteristics from the digital image 22, to extract image features that are mapped into the library 16.

In a non-limiting operational example, a user of the device 10 interacts with input/output and control circuitry 50, to perform an image capture operation of the device 10. Particularly, one or more embodiments of the device 10 include an image capture system 52, which may operate under control of a system processor 54. The image capture system 52 includes an image sensor 56, e.g., a CCD sensor, and an associated raw data processor 58. The processor 58 processes the low-level intensity/color data from the image sensor 56 to obtain a digital image 22, which may be held in a buffer 60 for subsequent processing, e.g., by the processing apparatus 12.

Advantageously, the device 10 includes one or more "context sensors" 62 that provide the context metadata 20 for the captured digital image 22. As a non-limiting example, the context sensors 62 include one or more of the following sensors: a GPS sensor 64, a time/date sensor 66, an ambient temperature sensor 68, a tilt/position sensor 69, and an ambient light sensor 71. It should be understood that the term "sensor" as used herein broadly encompasses actual digital or analog sensors, such as for ambient temperature and lighting, and more complex circuitry, such as digital clock/counters for date/time information and processing subsystems, such as for GPS location data. In at least one embodiment, the abstraction processor 18 is configured to receive at least one of temporal data, location data, ambient temperature data, image capture device orientation data (e.g., tilt), ambient lighting data, and ambient noise data, as said context metadata 20. Context sensor data may be provided to the processing apparatus 12 directly, or through interface circuitry 74, which provides analog-to-digital domain conversion, level shifting, formatting, buffering, etc., as needed.

Thus, in at least one embodiment, the device 10 captures a digital image 22 and obtains corresponding context metadata 20 from one or more context sensors 62, where the context metadata 20 identifies contextual data or parameters that are associated with the image capture and can be processed (abstracted) to obtain richer, more sophisticated annotation information for the image. Of course, in the same embodiment, or in one or more other embodiments, the digital image 22 and context metadata 20 may be transferred into the device 10 through a communication transceiver 76. In one embodiment, the transceiver 76 is a cellular communication transceiver configured for operation in a cellular communication network, such as GSM, Wideband CDMA, LTE, etc. In other embodiments, the transceiver 76 comprises or otherwise includes a local data interface (e.g., USB, Bluetooth, etc.).

Of course, those skilled in the art will appreciate that the advantageous annotation tag generation proposed herein is not dependent on the particular image capture/transfer details.

Figure 2:
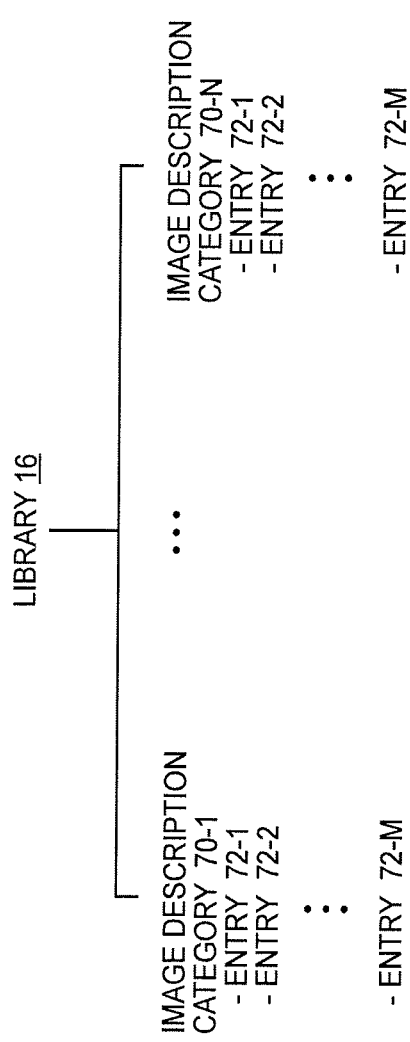
FIG. 2 is a diagram of one embodiment of a library of human-meaningful words or phrases organized as category entries according to a number of defined image description categories.

Of more interest regarding annotation tag generation, FIG. 2 depicts one embodiment of the library 16. In the depicted embodiment, the library 16 is maintained (in the memory 14) as one or more hierarchical sets of words or phrases for each defined image description category. Each such hierarchical set represents a series of words or phrases at increasing levels of abstraction. More particularly, each hierarchical set is depicted as an image description category 70 (e.g., categories 70-1 through 70-N), with each image description category 70 having a set of category entries 72 (e.g., 72-1 through 72-M).

As a non-limiting example, a given image description category 70-1 is "Place" and the category entries 72-1 through 72-M underneath comprise human-meaningful words or phrases representing place concepts along a line of increasing abstraction. For example, category entry 72-1 has a value "Europe," category entry 72-2 has a value "France," category entry 72-3 has a value of "Paris," and so on. Indeed, in one embodiment, a given category entry 72-x sits at a given level of abstraction, and may be implemented as an array of values. Using "Paris" as an example, the category entry 72-3 may be an array of city names, selectable based on GPS coordinate information in the context metadata 20, or based on image features extracted from the digital image 22 (e.g., landmark feature recognition). Likewise, the category entry 72-2 may be an array of European countries. In an alternate embodiment, each category entry 72-x is a given word or phrase, rather than an array of such words or phrases, but given category entries 72-x may individually represent a given level in the category hierarchy, or a group of category entries 72-x, 72-y, etc., may represent a given hierarchy level.

Figure 3:
FIG. 3 is a diagram of one embodiment of a rule that may be included in a defined set of deductive logic rules that are predicated on the defined image description categories of a library, such as that depicted in FIG. 2.

Regardless of the particular implementation logic used for the image description categories 70 and category entries 72, FIG. 3 partially illustrates one embodiment of the rules 30 that are predicated on the vocabulary metadata 24 generated by the abstraction processor 18, based on the library 16. In particular, one sees an example rule wherein a logical combination of two variables "x" and "y" is used to derive an annotation tag 28. Here, "x" takes on the value of category entry 72-1 for category 70-1, and "y" takes on the value of category 72-2 for category 70-2, for purposes of rule evaluation. Thus, the rule is predicated on those category entries 72 contained in the vocabulary metadata 24 obtained by mapping the context metadata 20 into the library 16 and/or by mapping extracted image features 80 into library 16. Additional rules can be evaluated to further refine or expand the set of generated annotation tags 28.

More broadly, it should be understood that the defined set of deductive logic rules 30 comprise a set of conditional tests predicated on variable entries for one or more of the defined image description categories 72 (from any number of image description categories 70). Correspondingly, the rules processor 26 is configured to generate annotation tags 28 for a given digital image 22 by substituting the category entries 72 making up the vocabulary metadata 24 as values for corresponding ones of the variable entries, and then logically evaluating the set of conditional tests according to the substituted category entries 72.

Figure 4:
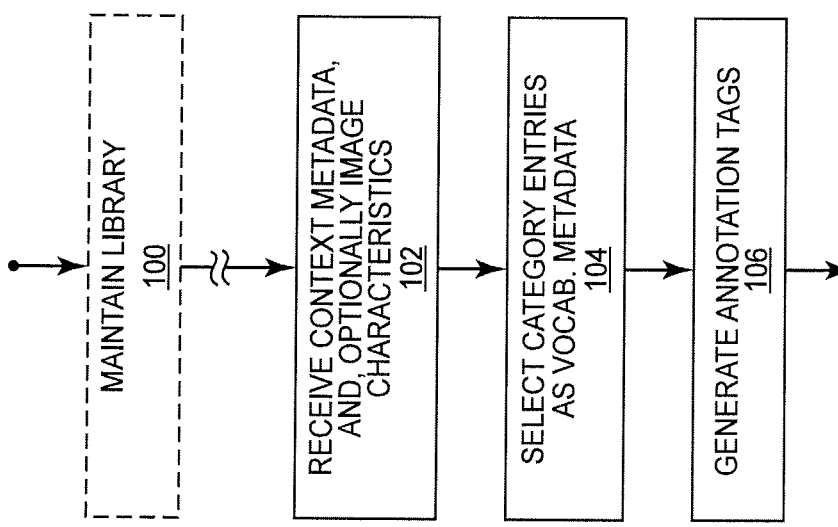

FIG. 4 depicts one embodiment of a method that implements the above processing, and it should be understood that the illustrated method can be embodied in hardware, software, or any combination thereof. In at least one embodiment, the processing apparatus 12 comprises one or more microprocessor-based circuits which implement annotation tag generation based on executing a corresponding series of computer program instructions that are stored in a computer-readable medium, e.g., in the memory 14. Preferably, the memory 14, which may comprise more than one memory device, includes non-volatile memory, such as FLASH or EEPROM, which can be used to store the library 16 in a manner that allows for updating or other modification.

The illustrated processing begins with "maintaining" the library 16 in memory (Block 100), which as a basic function includes storing the library 16 in accessible memory. In at least one embodiment, maintaining the library 16 connotes keeping the library updated responsive to user or other input. In any case, assuming that the library 16 is available to the abstraction processor 18, the method further includes receiving context metadata 20 and, optionally, receiving one or more image characteristics 80 (image features extracted from the digital image 22 by the image processor 42, or otherwise received for the digital image 22) (Block 102). Thus, in at least one embodiment, the abstraction processor 18 includes or is associated with an image processor 42 that is configured to derive one or more image characteristics from the digital image 22. In such embodiments, the abstraction processor 18 is configured to map one or more (extracted) image characteristics into the library 16, in addition to mapping the context metadata 20 into the library 16, to select particular category entries 72 as the vocabulary metadata 24 for the digital image 22.

The method therefore continues with selecting category entries 72 from the image description categories 70 in the library 16 based on mapping the context metadata 20 and/or the image characteristics 80 into the library 16. Such mapping entails logically identifying the particular category entries 72 that are directly or indirectly implicated by the context metadata 20 or the image characteristics 80. As a non-limiting example, "water" may be an extracted image feature, and "Type of Location" may be a given image description category 70-x, having category entries 72 that include the values of "Lake," "Ocean," "Beach," etc. Determining that the digital image 22 includes pixel data indicating the presence of water, which may be determined by evaluating color/reflectivity patterns, etc., allows the abstraction processor 18 to generate image-appropriate human-meaningful vocabulary metadata entries. Specifically, such processing allows the abstraction processor 18 to abstract from the presence of water features in the digital image 22 to the more abstract concepts of water-related locations, such as beach, shore, lake, etc. In any case, the abstraction processor 18 selects particular category entries 72 from one or more image description categories 70 in the library 16, to form the vocabulary metadata 24 (Block 104).

Processing continues with feeding the vocabulary metadata 24 and, optionally, one or more elements of the context metadata 20, into the rules 30, for generation of the annotation tags 28 (Block 106). That is, the selected category entries 72 are plugged into the corresponding variable locations in the individual rules making up the set of rules 30. With those substituted values in place, the rules processor 26 evaluates the logical conditions of each rule, and generates the annotation tags 28 based on the results of those conditional evaluations. As noted, in at least one embodiment, at least one rule in the defined set of deductive logic rules 30 is additionally or alternatively predicated on one or more items of context metadata 20. For example, at least one rule may be predicated on time-of-day, which may be taken directly from time/date information present in the context metadata 20. Thus, in one or more embodiments, the rules processor 26 is configured to generate annotation tags 28 for the digital image 22 by logically combining the vocabulary metadata 24 and the one or more items of context metadata 20, according to the defined set of deductive logic rules 30.

Figure 5:
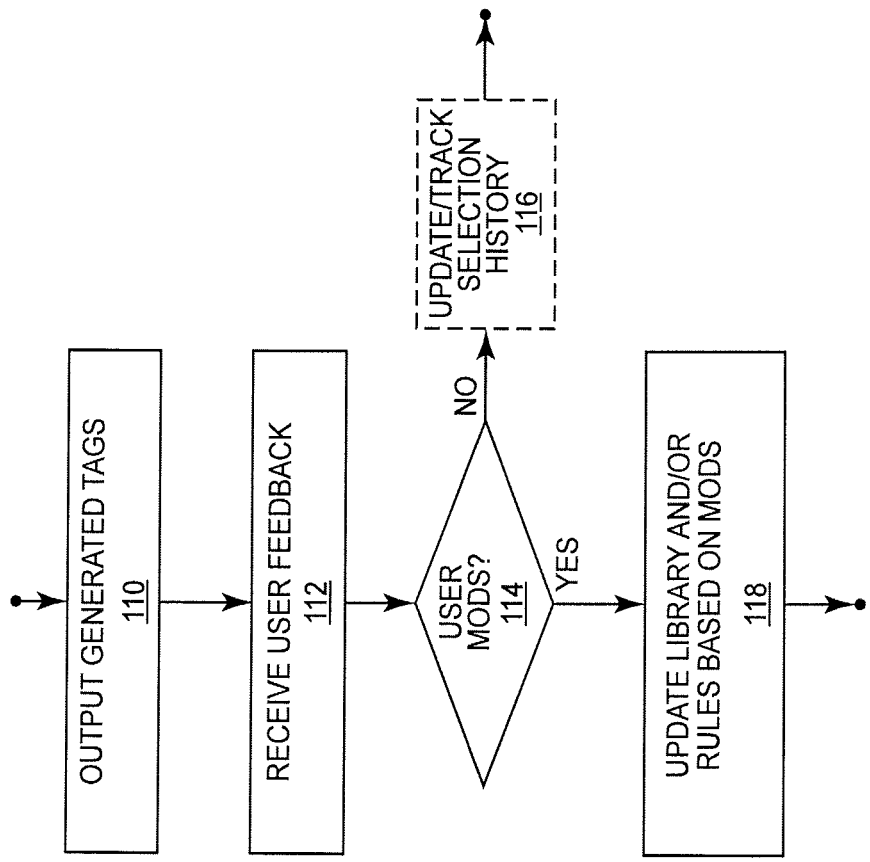
FIGS. 4 and 5 are logic flow diagrams of method embodiments for generating annotation tags (FIG. 4), and for adapting such generation to user feedback (FIG. 5).

Still further, FIG. 5 illustrates an optional extension of the processing of FIG. 4, which is practiced in one or more embodiments of annotation tag generation. More particularly, FIG. 5 illustrates one embodiment of dynamic updating of the library 16 and/or the rules 30, based on user feedback. This updating allows the library 16 and/or rules 30 to adapt to the particular preferences of the user of the device 10, and over time allows for the processing apparatus 12 to customize annotation tag generation to suit the particular phrasing preferred by the user, and to suit the particular locales frequented by the user, and the particular activities engaged in by the user.

In the illustrated embodiment, the rules processor 26 generates the annotation tags 28, as described above. The generated annotation tags 28 are output by the rules processor 26, such as by providing them to the interface/control circuits 50, for display to the user on an LCD display, or other output device (Block 110). The interface/control circuits 50 include, for example, a touch screen, keypad, or other input device, that allows the user to indicate which ones of the generated annotation tags 28 are to be used for annotating the digital image 22. Further, in at least one embodiment, the interface/control circuits 50 allow the user to input tag information to be used instead of, or in conjunction with, the generated annotation tags 28. For example, if none of the generated annotation tags 28 is considered appropriate by the user, the user may enter a specifically desired word or phrase to be used as the annotation tag, or the user may modify one of the proposed annotation tags 28, and indicate that the modified tag should be used.

Thus, the illustrated processing receives user feedback (Block 112) regarding the annotation tags 28 output to the user as proposed tags for the digital image 22, and detects whether the user modifies the proposed annotation tags 28 (including substitutions) (Block 114). The processing apparatus 12 may, for example, track the selection history for the user, such as by recording the selection frequencies for particular ones of the proposed annotation tags 28 (Block 116).

Processing further includes updating the library 16 and/or the rules 30, to reflect user modifications (Block 118). For example, if the user corrects or modifies a place name or other category entry 72-*x* of a given image description category 70-*y*, the processing apparatus 12 may update or replace the word or phrase stored for that category entry 72-*x*, based on the user input. Additionally, or alternatively, the processing apparatus 12 may add or modify the rules 30, to reflect user modifications of the generated annotation tags 28.

More broadly, in one or more embodiments, the processing apparatus 12 is configured to output one or more of the generated annotation tags 28 for inspection by a user, and to adapt at least one of the library 16 and the defined set of deductive logic rules 30, based on recording or otherwise detecting corresponding annotation tag selections or modifications made by the user. For example, in one embodiment, the processing apparatus 12 is configured to adapt the library 16 and/or the rules 30 by adding new category entries 72 (to one or more of the categories 7) and/or by modifying existing category entries 72, based on the corresponding annotation tag selections or modifications made by the user. Thus, in at least one embodiment of the processing apparatus 12, it is configured to maintain the library 16 of human-meaningful words or phrases based on receiving or otherwise storing a default library, and dynamically updating or adding category entries 72 to the default library, in response to user selections and modifications to the generation of annotation tags 28 as proposed by the processing apparatus 12 for one or more digital images 22. In this regard, the processing apparatus 12 is configured to output one or more of the generated annotation tags 28 to a user as proposed annotation tags for a given digital image 22, and to record in conjunction with the digital image 22 corresponding annotation tag inputs by the user. That is, the processing apparatus 12 is configured to provide the user with the generated annotation tags 28, such as in a list of proposed annotation tags, and to detect tag selections or modifications made by the user in view of the proposed list, and to record the selected and/or modified annotation tags in conjunction with the digital image 22.

Figure 6:
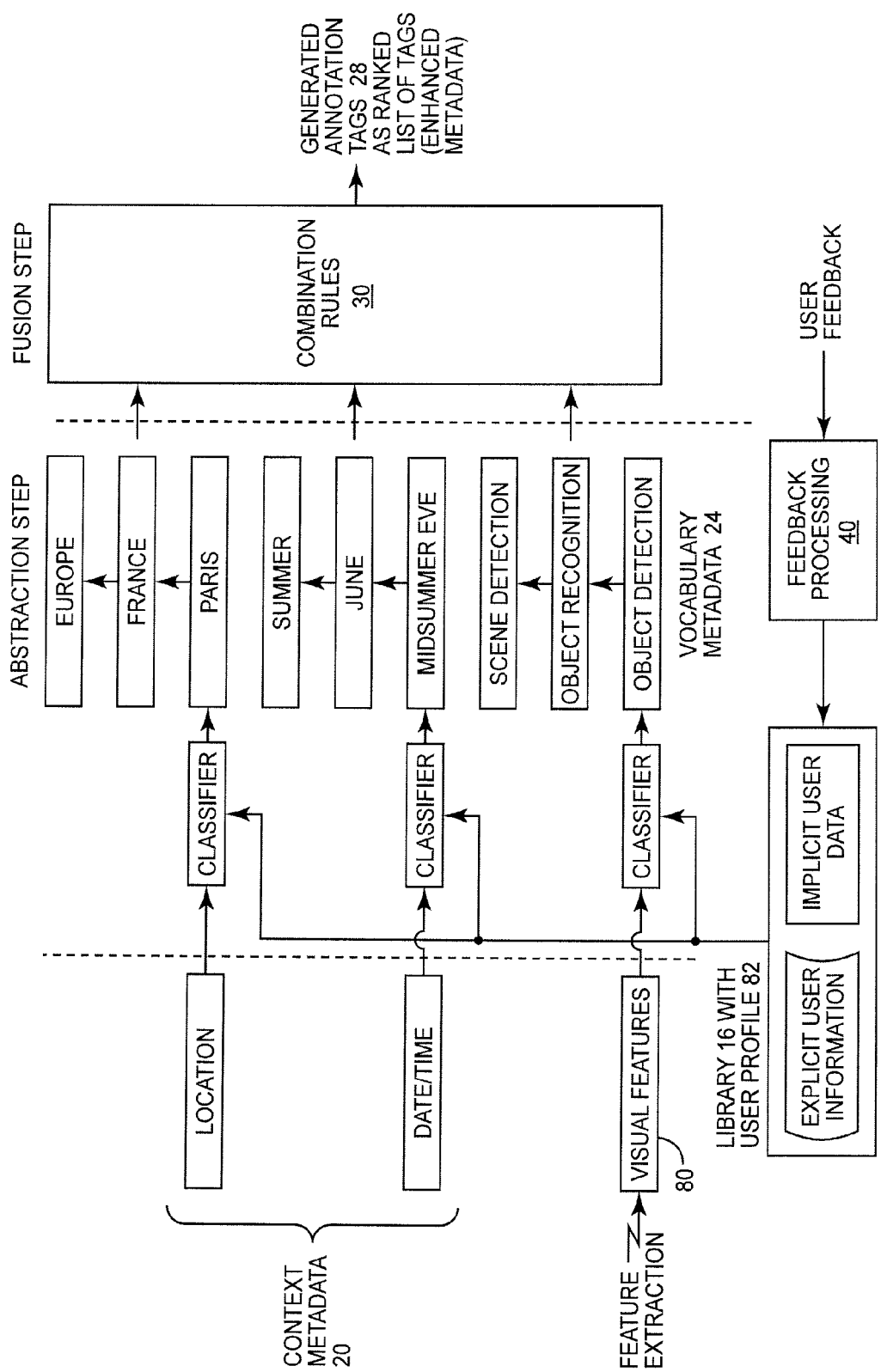
FIG. 6 is a diagram of one embodiment of tag generation operations and data flow, using example data.

With the above method and apparatus examples in mind, those skilled in the art will appreciate that FIG. 6 illustrates a non-limiting but concrete example of annotation tag generation as contemplated herein. In the illustration, the context metadata 20 is fed into a classification process that may be implemented as pre-processing for the abstraction step(s) used to generate the vocabulary metadata 24. In this regard, "classification" may be understood as initially determining which categories 70 and category entries 72 are implicated by the context metadata 20. For example, date/time information may be classified as "summertime," "evening," etc., and a given one of the image description categories 70 may be a "Temporal" category having those given category entry values, as well as other category entries 72, such as for common holidays, and other time-related words or phrases that can be abstracted from the date/time information. Like processing is performed for extracted image characteristics, e.g., landscape versus cityscape recognition, group versus individual person in the digital image 22, etc.

The abstraction processor 18 carries out the abstraction step by translating the "raw" context metadata 20 and/or image characteristics 80 into terms that better describe the semantic meaning of the digital image 22 for a human being. That is, the abstraction processor 18 maps the context metadata 20 and/or the image characteristics 80 into the library 16, based on determining which particular ones of the category entries 72, from any one or more of the image description categories 70, are implicated. The resultant abstracted words or phrases comprise the vocabulary metadata 24, which is input as variable values into the rules 30, which are predicated on the vocabulary metadata 24.

Rules processing by the rules processor 26 may be understood as a "fusion" step occurring after the "abstraction" step. The term "fusion" describes the rules processor's operations wherein it (logically) combines the human-meaning terms in the vocabulary metadata 24 into "enhanced" metadata tags, denoted herein as the annotation tags 28. That is, the rules processor 26 in one or more embodiments generates compound words or phrases by combining the selected category entries 72 in the vocabulary metadata, according to the conditional logic embodied in the rules 30. The generated annotation tags 28 are then output to a user for selection and/or modification. User feedback regarding those selections/modifications is returned to the feedback processor 40 of the processing apparatus 12, which uses that feedback to update the library 16 and/or rules 30. In at least one embodiment, a user profile 82 is maintained in conjunction with, or as part of the library 16, and the user profile 82 is updated as a function of the feedback. Non-limiting examples of the user profile 82 include one or more of user name, residence, work, and vacation locations, hobby/activity information, names and corresponding facial recognition data for family, friends, acquaintances, tag selection/modification histories, etc.

FIGS. 7 and 8 illustrate non-limiting examples of the rules 30. In FIG. 7, in particular, one sees a first conditional rule that is predicated on an image description category 70 defined as "position" and on another image description category defined as "image classification." The rules processor 26 tests the logical truth of this rule by evaluating corresponding category entries 72 in the vocabulary metadata 24 to test whether there is a category entry 72 falling under the position category 70 that has the value "summer house," and, likewise, whether there is a category entry 72 falling under the image classification category 70 that has the value "indoors." If so, the first rule's conditional tests evaluate as "TRUE" and the rule's action is carried out, i.e., the proposed phrase "in the summer house" is added to the annotation tags 28 being generated for the digital image 22. Thus, one sees that the proposed annotation tag is a fusion of the category entry values in the vocabulary metadata 24, e.g., the string values of two or more category entries 72 are concatenated, or otherwise combined, or a new, richer phrase is derived from the evaluation of particular combinations of category entries 72 taken from the vocabulary metadata 24.

Notably, one sees in FIG. 8 that another image description category may be "video classification," which may take on any one or more category entries 72 defined for various types of videos (vacation, holiday, sporting event). The abstraction processor 18 may evaluate features extracted for a given video-type digital image 22, e.g., crowds, recognizable structures, equipment, etc, and/or evaluate date/time and location information, to determine which category entries 72 for the video classification category are implicated for a given digital image 22.

As further examples of the logical fusion of words and phrases provided by the rules processing consider that the rules 30 in one or more embodiments are used to associate predicate facts to infer new facts, i.e., to use items of vocabulary metadata 24 and/or items of context metadata 20 to infer new facts, which may be compound formulations. For example, according to a given rule, if (position="summer house") AND (image_classification="indoor") ADD "in summer house" TO the set of annotation tags 28 to be proposed. (Here, AND represents the logical ANDing of the conditional tests, and "=" denotes the "equal to" test. As another example, if (position="New York") AND (image_classification="cityscape") ADD "New York City" TO the set of annotation tags 28 to be proposed. In yet another example, if (position="summer house") AND (image_classification="face_detect") ADD "in summer house with friends" TO the set of annotation tags 28 to be proposed. Still further, if (time_of_capture="2008-08-20") AND (position="summer house") AND (image_classification="group_detect" ADD "mid summer party in summer house" TO the set of annotation tags 28 to be proposed to the user.

As a further sophistication, the abstraction processor 18 is configured to use fuzzy logic or other membership-determining logic, to make weighted estimations of the degree to which particular category entries 72 are implicated by given context metadata 20 and/or by given image characteristics 80. For example, high levels of ambient light can indicate a daytime outdoors location, or can indicate that the digital image 22 was captured in a well-lit room. Thus, the abstraction processor 18 has less than full confidence that the digital image 22 was captured indoors or was captured outdoors. In response, it might indicate a 50/50 confidence weighting for the "indoors" category entry 72 and for the "outdoors" category entry 72 under the image classification category 70.

Of course, the abstraction processor 18 in such embodiments is configured to relate or cross-check given items of context metadata 20, to make higher-confidence guesses about the most likely or appropriate category entries 72 to select for a given digital image 22. For example, it may detect that high ambient light is detected in conjunction with landscape-related image features, in which case it may assign a confidence value of "1" to the category entry "outdoors," or at least weight "outdoors" much more heavily than "indoors" (e.g., a weighting of 0.8 for the outdoors category entry versus a 0.2 weighting for the indoors category entry. Other data can be related to further refine the confidence weighting. For example, indicated high or low ambient temperatures further suggest an outdoor location rather than an indoor location.

Figure 9:
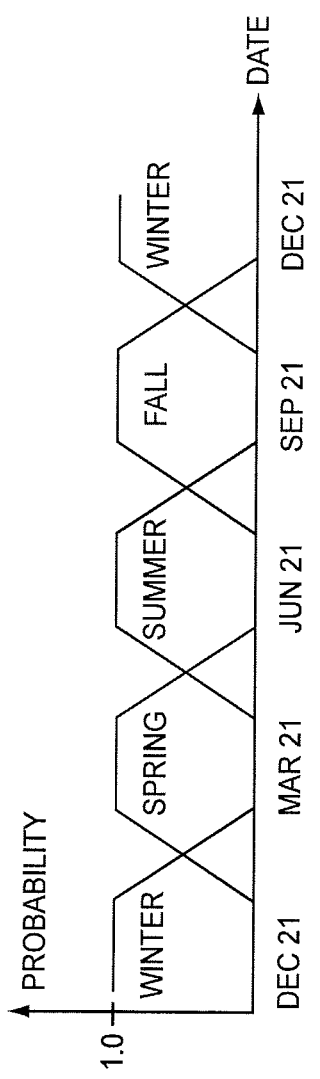
FIGS. 9 and 10 are diagrams of example fuzzy logic or other membership-based implementations for determining weighted values for use in generating or ranking annotation tags.
Figure 10:
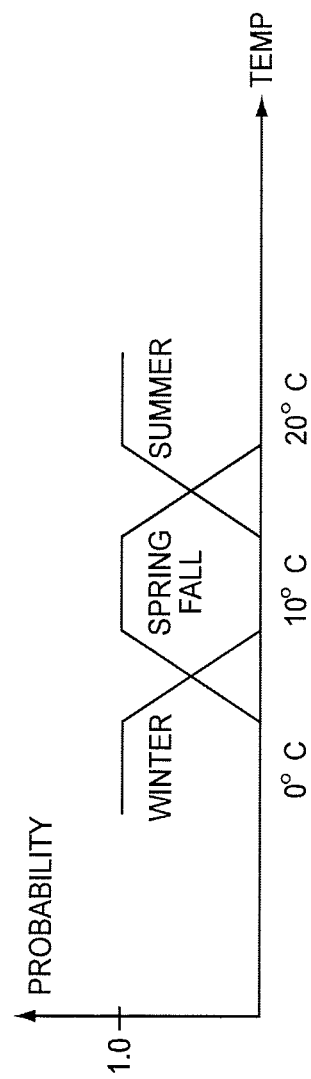

Thus, FIG. 9 illustrates one example of weighted category entry generation for the vocabulary metadata 24, wherein one of the image description categories 70 is "Season," having category entries 72 of "Winter," "Spring," "Summer," and "Fall." That is, from the abstraction processor's perspective, the image description category "Season" has defined values of "Winter," "Spring," "Summer," and "Fall." The abstraction processor 18 includes in the vocabulary metadata 24 one or more of these values, which can be confidence weighted according to the date-based fuzzy membership rules shown in FIG. 9. Perhaps of more interest, FIG. 10 shows that similar confidence weightings for season values can be inferred from ambient temperature data. Thus, even if reliable date information is not available for a given digital image 22, the abstraction processor 18 can nonetheless make inferences about the season. (Additionally, or alternatively, one of the extracted image characteristics may be "snow" or the like, and that information can be used to compute seasonal value weightings.)

Continuing with this confidence-weighted example, those skilled in the art will appreciate that the rules 30 and the rules processor 26 are, in one or more embodiments, configured to incorporate confidence weightings for more sophisticated rules evaluation and annotation tag generation. For example, confidence values for the category entries 72 included in the vocabulary metadata 24 are stored or otherwise maintained as part of the vocabulary metadata 24, and used by the rules processor 26 in its subsequent rules processing. In one such approach, the confidence values are used in the actual conditional testing of each rule, while in other embodiments, the rules are evaluated with full-weighted values (e.g., pure True or False) conditional tests, but the confidence weights are then used to rank the generated annotation tags 28 according to their probabilities, i.e., a particular annotation tag is higher or lower ranked according to whether the rule producing that tag evaluated items of vocabulary metadata 24 that were known with high confidence or with low confidence.

As an example of confidence weightings, assume context metadata 20 including a date item of June 6 and an ambient temperature item of 15° C. Season probabilities based on the date may then be determined as: Spring=0.1, Summer=0.9, Fall=0.0, and Winter=0.0. Season probabilities based on temperature may be determined as: Spring=0.3, Summer=0.4, Fall=0.3, and Winter=0.0. The corresponding combined probabilities are given as: Spring=0.077, Summer=0.923, Fall=0.0, and Winter=0.0. From these weightings, the rules processor 26 determines that it is most likely summer and hence ranks summer-related annotation tags higher in a ranked list of annotation tag proposals that make up the output annotation tags 28.

However, regardless of whether confidence weightings are used, the processing apparatus 12 and its associated method provide a set of domain ontologies that describe human-meaningful concepts such as the local calendar, geographical maps, objects, sights of interest, landmarks, and human activities/endeavors. These ontologies are captured or otherwise embodied within the structure of the library 16, and, together with the rules 30, they are used to generate sophisticated annotation tag proposals for any given digital image 22. Further, based on the user's selection of given proposed annotation tags, or modification of such tags, the processing apparatus 12 and its associated method can be made adaptive, wherein new facts can be learned or otherwise inferred, such as by adding new categories 70 and/or category entries 72 to the library 16 (or modifying existing library data), and/or by adding to or modifying the rules 30.

Proposed abstractions and rules-based fusion include using location and date to propose annotation tags corresponding to known local events and holidays. For example, detecting location as "Munich" and date as "October" can be used to generate "Octoberfest" as a proposed annotation tag. As another example, detecting season as summer, image characteristics as water and/or beach can be used to generate "summer vacation at the shore" or "swimming/boating" as proposed annotation tags.

Broadly, one or more embodiments of the processing apparatus 12 includes an abstraction processor 18 that is configured to assign a confidence or fuzzy logic weighting value to each selected category entry 72 making up the vocabulary metadata. The weightings are assigned based on the extent to which each particular category entry 72 can be reliably deduced from the context metadata 20 (or, likewise, from image characteristics 80). Correspondingly, the rules processor 26 is configured to logically combine the vocabulary metadata 24 (i.e., to logically combine selected items in the vocabulary metadata 24 with other selected items in vocabulary metadata 24 and/or the context metadata 20). For embodiments that use confidence weighting, such combining can be carried out by performing a weighted evaluation of truthfulness for the conditional tests based on the confidence or fuzzy logic weighting values, or full-weighted values can be evaluated in the rules, with the weightings used to rank individual tags comprising the resulting set of proposed annotation tags 28.

Further, in one or more embodiments, particular geographic coordinates may be mapped to famous landmarks, e.g., S41°27.4658, E173°57.2819° is recognized as the coordinates for the Eiffel tower. However, according to the teachings herein, further data may be processed, such as facial image recognition data, temperature, season, lighting, etc., to generate much more sophisticated annotation tags, such as "a warm July night at the Eiffel tower," or "springtime in Paris." As a further point of sophistication, tags, such as for famous landmarks, may also be suggested (or not) based on how far away from home the user is. If the user lives in Paris close to the Eiffel tower, sights such as the Eiffel tower might not be suggested since it is most likely not of interest of the user.

Additionally, as noted, the processing apparatus 12 in one or more embodiments incorporates a historic perspective. For example, the annotation tags a user has chosen for either previous digital images 22 in a series (vacation series, people in an image etc.) or for a similar capture (e.g. a fan always tagging shots with his favorite team), may be used to propose specific annotation tags. For example, the rules 30 may include the rule that if (position="summer house") AND (annotation_previous="vacation Archipelago 2008") AND (equal_day_of_capture) ADD "vacation Archipelago 2008" TO the set of annotation tags 28 to be proposed. Similarly, the rules 30 may include a rule that if (video_classification="soccer match" AND (position="London" AND (soccer_history="Arsenal") ADD "Arsenal London" TO the set of annotation tags 28 to be proposed.

With these and other examples in mind, those skilled in the art will appreciate the many advantages provided by the processing apparatus 12 and its associated method of generating annotation tags. Non-limiting examples of those inventions include much more automatic generation of much more sophisticated annotation tags, which is particularly useful given that camera phones represent a new class of networked media capture devices that are rapidly becoming ubiquitous, and may actually represent the most common devices for capturing digital images. As a further advantage, all or part of the processing apparatus 12 and its associated method may be implemented in the oftentimes considerable processing resources included in camera phones. (For example, in referring to FIG. 1, the system processor 54 may comprise a relatively sophisticated embedded processor that provides, for example, an operating system or other hosting environment for implementing the processing system 12. In at least one embodiment, the processing apparatus 12 is implemented in whole or in part using the CPU and memory of the host device 10.

Further, annotation tag generation as taught herein provides opportunities for telecommunication operators, such as in providing supporting content management features (e.g., picture and/or tag storage). In other embodiments, the processing apparatus 12 is implemented as part of a network-based processing system, thereby allowing the network operator to provide annotation tag generation as a service. In such embodiments, digital images captured by users of mobile terminals can be transferred to the network for processing, or can be processed in the terminals via downloaded applets or other such software.

Of course, the present invention is not limited to the examples detailed in the foregoing discussion, nor is it limited to the embodiments illustrated in the accompanying illustrations. Instead, the present invention is limited only by the following claims, and their legal equivalents.

What is claimed is:

1. A method of generating annotation tags for a digital image characterized by:

maintaining a library of human-meaningful words or phrases organized as category entries according to a number of defined image description categories;
   receiving context metadata for the digital image that is associated with capture of the digital image;
   selecting particular category entries as vocabulary metadata for the digital image by mapping the context metadata into the library;
   generating annotation tags for the digital image by logically combining the vocabulary metadata according to a defined set of deductive logic rules that are predicated on the defined image description categories, said defined set of deductive logic rules comprising a set of conditional tests predicated on variable entries for one or more of the defined image description categories, such that said generating annotation tags for the digital image comprises substituting the category entries making up the vocabulary metadata as values for corresponding ones of the variable entries, and then logically evaluating the set of conditional tests according to the substituted category entries;
   determining confidence or fuzzy logic weighting values from the context metadata, said confidence or fuzzy logic weighting values numerically expressing the extents to which given ones of the substituted category entries apply to the digital image; and
   ranking the generated annotation tags from most likely to least likely, in terms of applicability to the digital image, according to the confidence or fuzzy logic weighting values, or incorporating the confidence or fuzzy logic weighting values into said logical evaluation of the set of conditional tests, whereby the truthfulness of each conditional evaluation depends on the confidence or fuzzy logic weighting values, such that the generated annotation tags correspond to higher-weighted category entries or combinations thereof.

2. The method of claim 1, wherein maintaining the library comprises maintaining one or more hierarchical sets of words or phrases for each defined image description category, each hierarchical set representing a series of words or phrases at increasing levels of abstraction.

3. The method of claim 1, further comprising deriving one or more image characteristics from the digital image and mapping the one or more image characteristics into the library, in addition to mapping the context metadata into the library, to select particular category entries from one or more of the image description categories, as the vocabulary metadata for the digital image.

4. The method of claim 1, further comprising outputting one or more of the generated annotation tags for inspection by a user, and adapting at least one of the library and the defined set of deductive logic rules based on recording or otherwise detecting corresponding annotation tag selections or modifications made by the user.

5. The method of claim 4, wherein said adapting at least one of the library and the defined set of deductive logic rules comprises at least one of adding new category entries and changing category entries, based on the corresponding annotation tag selections or modifications made by the user.

6. The method of claim 1, wherein said maintaining a library of human-meaningful words or phrases includes receiving or otherwise storing a default library, and dynamically updating or adding category entries to the default library responsive to user selections and modifications to annotation tags as generated for one or more digital images.

7. The method of claim 1, wherein said mapping the context metadata into the library comprises determining which category entries are implicated by the context metadata, by determining which category entries are correlated with the context metadata.

8. The method of claim 1, further comprising determining the numerical values for one or more of said confidence or fuzzy logic weighting values by cross-checking relations among items of the context metadata.

9. A processing apparatus for generating annotation tags for a digital image, said processing apparatus comprising an electronic circuit that comprises:
   a memory for maintaining a library of human-meaningful words or phrases organized as category entries according to a number of defined image description categories;
   an abstraction processor configured to receive context metadata for the digital image that is associated with capture of the digital image and select particular category entries as vocabulary metadata for the digital image by mapping the context metadata into the library; and a rules processor configured to generate annotation tags for the digital image by logically combining the vocabulary metadata according to a defined set of deductive logic rules that are predicated on the defined image description categories;
   wherein said defined set of deductive logic rules comprises a set of conditional tests predicated on variable entries for one or more of the defined image description categories;
   wherein said rules processor is configured to generate annotation tags for the digital image by substituting the category entries making up the vocabulary metadata as values for corresponding ones of the variable entries, and then logically evaluating the set of conditional tests according to the substituted category entries; and
   wherein said processing apparatus is further configured to:
   determine confidence or fuzzy logic weighting values from the context metadata, said confidence or fuzzy logic weighting values numerically expressing the extents to which given ones of the substituted category entries apply to the digital image; and
   rank the generated annotation tags from most likely to least likely, in terms of applicability to the digital image, according to the confidence or fuzzy logic weighting values, or incorporate the confidence or fuzzy logic weighting values into said logical evaluation of the set of conditional tests, whereby the truthfulness of each conditional evaluation depends on the confidence or fuzzy logic weighting values, such that the generated annotation tags correspond to higher-weighted category entries or combinations thereof.

10. The processing apparatus of claim 9, wherein the library comprises one or more hierarchical sets of words or phrases for each defined image description category, each hierarchical set representing a series of words or phrases at increasing levels of abstraction.

11. The processing apparatus of claim 9, wherein the abstraction processor includes or is associated with an image processor that is configured to derive one or more image characteristics from the digital image, and wherein the abstraction processor is configured to map the one or more image characteristics into the library, in addition to mapping the context metadata into the library, to select particular category entries from one or more image description categories, as the vocabulary metadata for the digital image.

12. The processing apparatus of claim 9, wherein the processing apparatus is configured to output one or more of the generated annotation tags for inspection by a user, and to adapt at least one of the library and the defined set of deductive logic rules based on recording or otherwise detecting corresponding annotation tag selections or modifications made by the user.

13. The processing apparatus of claim 12, wherein the processing apparatus is configured to adapt at least one of the library and the defined set of deductive logic rules by at least one of adding new category entries and modifying existing category entries, based on the corresponding annotation tag selections or modifications made by the user.

14. The processing apparatus of claim 9, wherein the processing apparatus is configured to maintain the library of human-meaningful words or phrases based on receiving or otherwise storing a default library, and dynamically updating or adding category entries to the default library in response to user selections and modifications to the generation of annotation tags for one or more digital images.

15. The processing apparatus of claim 9, wherein said abstraction processor is configured to map the context metadata into the library by determining which category entries are implicated by the context metadata, based on determining which category entries are correlated with the context metadata.

16. The processing apparatus of claim 9, wherein said processing apparatus is configured to determine the numerical values for one or more of said confidence or fuzzy logic weighting values by cross-checking relations among items of the context metadata.

* * * * *